United States Patent
Breese

(10) Patent No.: US 6,761,503 B2
(45) Date of Patent: Jul. 13, 2004

(54) SPLINED MEMBER FOR USE IN A SLIP JOINT AND METHOD OF MANUFACTURING THE SAME

(75) Inventor: Douglas E. Breese, Walbridge, OH (US)

(73) Assignee: Torque-Traction Technologies, Inc., Holland, OH (US)

( * ) Notice: Subject to any disclaimer, the term of this patent is extended or adjusted under 35 U.S.C. 154(b) by 0 days.

(21) Appl. No.: 10/131,752

(22) Filed: Apr. 24, 2002

(65) Prior Publication Data

US 2003/0202846 A1 Oct. 30, 2003

(51) Int. Cl.[7] .................................................. B25G 3/28
(52) U.S. Cl. ........................ 403/359.5; 464/167; 384/49
(58) Field of Search .......................... 403/359.1, 359.3, 403/359.5, 359.6, 359.2, 359.4, 355, 358; 464/167, 168; 384/49, 51

(56) References Cited

U.S. PATENT DOCUMENTS

| | | | | |
|---|---|---|---|---|
| 1,270,533 A | * | 6/1918 | Lombard ................ 192/110 B |
| 2,397,538 A | * | 4/1946 | Davis ......................... 464/81 |
| 2,599,969 A | | 6/1952 | Bajulaz |
| 2,992,548 A | * | 7/1961 | Walterscheid-Muller et al. ........................ 464/162 |
| 3,112,627 A | * | 12/1963 | Gissel ....................... 464/162 |
| 3,345,832 A | * | 10/1967 | Bottoms ..................... 464/15 |
| 3,392,599 A | * | 7/1968 | White ........................ 74/492 |
| 3,494,148 A | * | 2/1970 | Young ....................... 464/168 |
| 3,879,093 A | | 4/1975 | Betrix |
| 4,133,190 A | | 1/1979 | Schuller |
| 4,254,639 A | * | 3/1981 | Teramachi .................. 464/167 |
| 4,406,641 A | * | 9/1983 | Mallet ....................... 464/162 |
| 4,433,875 A | * | 2/1984 | Walter et al. ................ 384/49 |
| 4,667,530 A | * | 5/1987 | Mettler et al. .............. 74/493 |
| 4,799,803 A | | 1/1989 | Tanaka |
| 5,460,574 A | * | 10/1995 | Hobaugh .................... 464/162 |
| 5,553,966 A | * | 9/1996 | Morelli et al. .............. 403/355 |
| 5,584,765 A | * | 12/1996 | Ochiai ....................... 464/168 |
| 5,645,366 A | * | 7/1997 | Ishibashi et al. .......... 403/359.5 |
| 5,674,026 A | * | 10/1997 | Ishibashi et al. .......... 403/359.5 |
| 5,709,605 A | * | 1/1998 | Riefe et al. .................. 464/83 |
| 6,343,993 B1 | * | 2/2002 | Duval et al. ................ 464/167 |
| 6,474,868 B2 | * | 11/2002 | Geyer et al. ................. 384/49 |
| 6,557,433 B1 | * | 5/2003 | Castellon .................... 74/492 |

FOREIGN PATENT DOCUMENTS

| | | | |
|---|---|---|---|
| DE | 197 35 443 | 2/1999 | |
| DE | 198 17 290 | 10/1999 | |
| EP | 1065397 A1 | * 1/2001 | ............. F16D/3/06 |
| JP | 2000160101 | 5/2000 | |
| WO | WO 99/25983 | 5/1999 | |

* cited by examiner

Primary Examiner—Lynne H. Browne
Assistant Examiner—Jori Schiffman
(74) Attorney, Agent, or Firm—MacMillan, Sobanski & Todd, LLC

(57) ABSTRACT

An improved female splined member includes a female tubular member having an inner surface provided with a plurality of longitudinally extending grooves that are sized and spaced in accordance with a desired number and position of splines to be formed. A plurality of elongate rods is disposed in respective longitudinally extending grooves formed in the inner surface of the female tubular member. A quantity of positioning material is provided within spaces provided between the elongate rods and the longitudinally extending grooves. The positioning material is hardened to support the elongate rods in the longitudinally extending grooves to define a plurality of inwardly extending splines in the female splined member. An improved method for manufacturing a female splined member includes the initial step of providing a female tubular member having an inner surface provided with a plurality of circumferentially spaced, longitudinally extending grooves. Next, an elongate rod is provided in each of the longitudinally extending grooves in the female tubular member. Then, a quantity of positioning material is provided into spaces provided between the elongate rods and the longitudinally extending grooves in the female tubular member. Thereafter, the positioning material is allowed to harden.

14 Claims, 5 Drawing Sheets

US 6,761,503 B2

SPLINED MEMBER FOR USE IN A SLIP JOINT AND METHOD OF MANUFACTURING THE SAME

BACKGROUND OF THE INVENTION

This invention relates in general to slip joints, such as are commonly used in vehicle drive train systems, for transmitting rotational force or torque between telescoping members, while accommodating a limited amount of relative axial movement therebetween. In particular, this invention relates to an improved structure for a splined member that is adapted for use in such a slip joint.

In a typical land vehicle, a drive train system is provided for transmitting rotational power from an engine/transmission assembly to an axle assembly so as to rotatably drive one or more wheels of the vehicle. A typical drive train system includes a driveshaft assembly that is connected between an output shaft of the engine/transmission assembly and an input shaft of the axle assembly. To accomplish this, a first universal joint is connected between the output shaft of the engine/transmission assembly and a first end of the driveshaft assembly, while a second universal joint is connected between a second end of the driveshaft assembly and the input shaft of the axle assembly. The universal joints provide a rotational driving connection from the output shaft of the engine/transmission assembly through the driveshaft assembly to the input shaft of the axle assembly, while accommodating a limited amount of angular misalignment between the rotational axes thereof.

Not only must the drive train system accommodate a limited amount of angular misalignment between the engine/transmission assembly and the axle assembly, but it must also typically accommodate a limited amount of relative axial movement therebetween. A small amount of such relative axial movement frequently occurs when the vehicle is operated. To address this, it is known to provide a slip joint in the driveshaft assembly of the drive train system. A typical slip joint includes male and female telescoping members having respective pluralities of splines formed thereon. The male splined member has a plurality of outwardly extending splines formed on the outer surface thereof that cooperate with a plurality of inwardly extending splines formed on the inner surface of the female splined member. The cooperating splines of the male and female members provide a rotational driving connection through the slip joint, while permitting a limited amount of relative axial movement therebetween. The slip joint may be provided at the ends of the driveshaft assembly or in the interior thereof, as desired.

Conventional splined members are often formed by a machining process, wherein material is removed from a member to form splines therein. To accomplish this, the member is initially formed having a surface of predetermined size and shape. Then, a cutting tool (such as a hobbing tool) is moved into engagement with the surface of the member to remove some of the material therefrom. The material that remains on the member becomes the plurality of splines. As a result of this machining process, the splines are usually formed having relatively square faces, i.e., faces that are generally flat and extend generally radially relative to the rotational axis of the member. Then, the splined member is coated with a material having a relatively low coefficient of friction. The low friction coating is provided to minimize the amount of force that is required to effect relative movement between the two splined members. Also, the low friction coating provides a relatively tight fit between the cooperating splines of the two splined members, thus minimizing any undesirable looseness therebetween while continuing to allow free axial movement.

Although the above-described machining process for forming splines has functioned satisfactorily for many years, it has been found to be somewhat inefficient. This is because the machining process has been found to be relatively slow and expensive to perform. Also, the machining process results in a quantity of scrap material of which must be disposed. Thus, it would be desirable to provide an improved structure for a splined member for use in a slip joint and an improved method for manufacturing the same.

SUMMARY OF THE INVENTION

This invention relates to an improved structure and method for manufacturing a splined member for use in a slip joint for transmitting rotational force between two members, while accommodating a limited amount of relative axial movement therebetween. The splined member can include a female tubular member having an inner surface provided with a plurality of longitudinally extending grooves that are sized and spaced in accordance with a desired number and position of splines to be formed. A elongated rod is disposed in each of the longitudinally extending grooves formed in the inner surface of the female tubular member. A quantity of positioning material is provided within spaces provided between the elongated rods and the longitudinally extending grooves. The positioning material is then hardened to support the elongated rods in the longitudinally extending grooves to define a plurality of inwardly extending splines in the female splined member.

Various objects and advantages of this invention will become apparent to those skilled in the art from the following detailed description of the preferred embodiment, when read in light of the accompanying drawings.

DETAILED DESCRIPTION OF THE PREFERRED EMBODIMENTS

Figure 1:
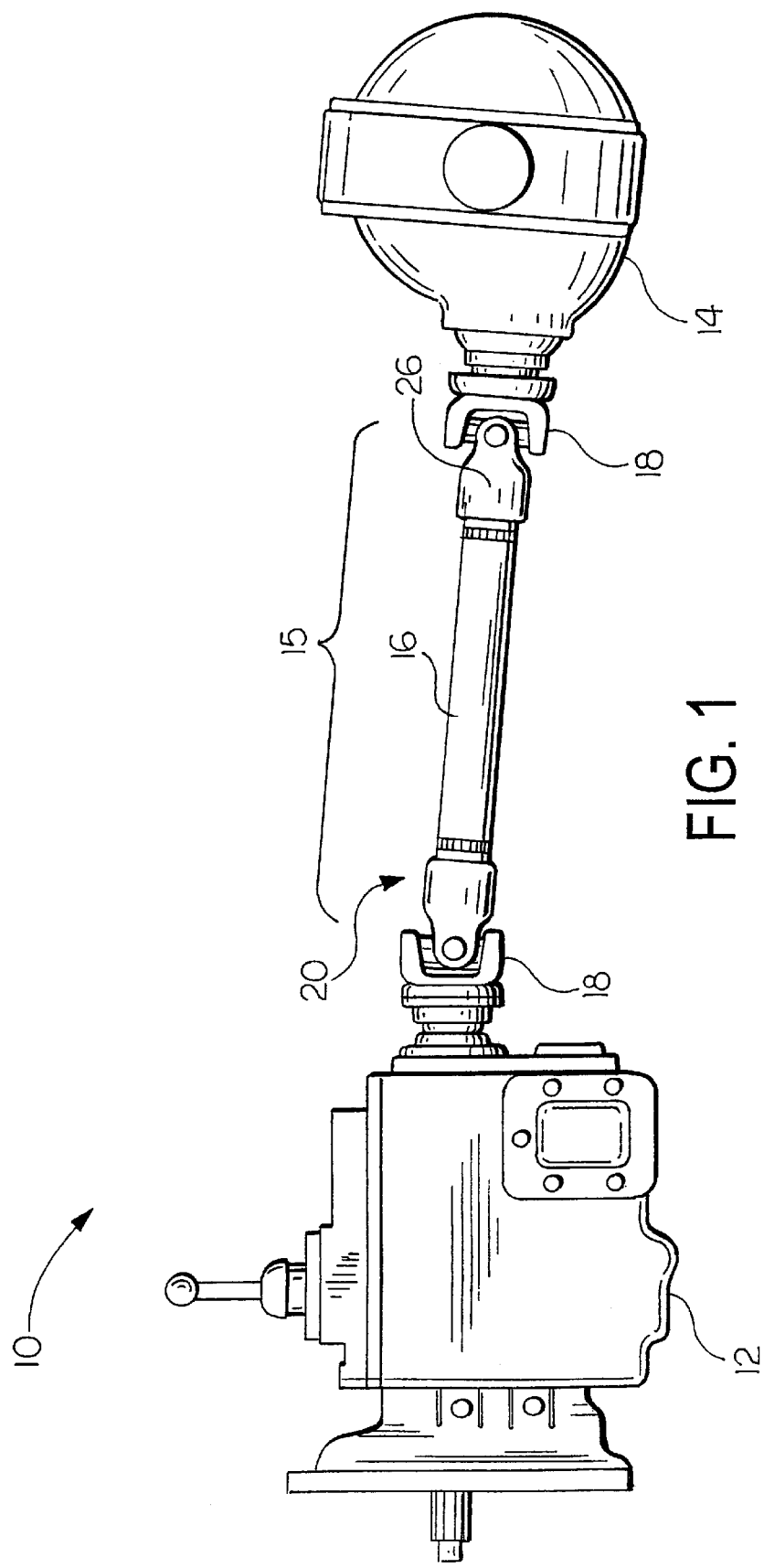
FIG. 1 is a schematic side elevational view of a vehicle drive train system including a slip joint in accordance with this invention.

Referring now to the drawings, there is illustrated in FIG. 1 a drive train system, indicated generally at 10, in accordance with this invention. The illustrated drive train system 10, which is intended to be representative of any drive train system (vehicular or otherwise) for transferring rotational power from a source to a driven device, includes a transmission 12 having an output shaft (not shown) that is connected to an input shaft (not shown) of an axle assembly 14 by a driveshaft assembly 15. The transmission 12 and the axle assembly 14 are conventional in the art. The driveshaft assembly 15 includes a hollow cylindrical driveshaft tube 16 that extends from a front end adjacent to the transmission 12 to a rear end adjacent to the axle assembly 14. The driveshaft assembly 15 further includes a pair of universal joints 18 for rotatably connecting the output shaft of the transmission 12 to the front end of the driveshaft assembly 15 and for rotatably connecting the rear end of the driveshaft assembly 15 to the input shaft of the axle assembly 14. The universal joints 18 are also conventional in the art.

A slip joint, indicated generally at 20, is provided for connecting the rear end of the front universal joint 18 to the front end of the driveshaft tube 16. The structure of the slip joint 20 is illustrated in detail in FIG. 2. As shown therein, the slip joint 20 includes a female splined member, indicated generally at 22, including a female tubular member 22a having a plurality of inwardly extending splines that are defined by a plurality of circumferentially spaced, elongated rods 23. The elongated rods 23 extend radially inwardly from an inner surface of the female tubular member 22a to define the splines. The female splined member 22 further has a pair of spaced apart yoke arms (not shown in FIG. 2) formed thereon that extend axially from the female tubular member 22a and are connected to the front universal joint 18. Thus, the female splined member 22 is typically referred to as a slip yoke.

The slip joint 20 also includes a male member, indicated generally at 24, that includes a cylindrical body portion 24a having a plurality of circumferentially spaced, longitudinally extending grooves 24b formed in an outer surface thereof. A plurality of balls 25 are disposed in the longitudinally extending grooves 24b formed in the cylindrical body portion 24a. The balls 25 can be formed from a hardened, low-friction material, such as steel. Travel of the balls 25 throughout the grooves 24b may be limited by a mechanical stop or interference member, such as a cage generally indicated at 19. The male member 24 further includes a reduced diameter neck portion 24c that is secured to the forward end of the driveshaft tube 16 in a conventional manner, such as by welding. The cylindrical body portion 24a and the balls 25 supported thereby are sized to fit telescopically within the splined end of the female splined member 22 such that the elongate rods 23 cooperate with the balls 25 in respective longitudinally extending grooves 24b to form the slip joint 20. The telescoping nature of the slip joint assembly 20 facilitates the installation of the driveshaft assembly 15 within a vehicle, accommodates relative axial movement between the transmission 12 and the axle assembly 14 (such as might be caused by movement of the vehicle over rough terrain), and provides for some collapsibility of the driveshaft in the event of a collision of the vehicle.

Referring back to FIG. 1, a tube yoke 26 is provided for connecting the rear end of the driveshaft tube 16 to the rear universal joint 18. The tube yoke 26 is conventional in the art and can be secured to the rearward end of the driveshaft tube 16 in any conventional manner, such as by welding. It will be appreciated that the female splined member 22 may alternatively be provided at the forward end of the driveshaft tube 16 and the pair of spaced apart arms that are connected to the front universal joint 18 may extend axially from the male member 24. It will also be appreciated that the slip joint 20 may alternatively be provided for connecting the rear end of the driveshaft tube 16 to the rear universal joint 18, and that the tube yoke 26 may be provided for connecting the front end of the driveshaft tube 16 to the front universal joint 18. Alternatively, it will be appreciated that the slip joint 20 may be provided in an intermediate or interior portion of the driveshaft tube 16, such as is commonly found in three joint driveshaft assemblies, wherein the driveshaft tube 16 is split into two driveshaft tube sections. Similarly, a number of other splined components are commonly used in conventional driveshaft assemblies, and the scope of this invention is intended to cover such other splined components.

Figure 2:
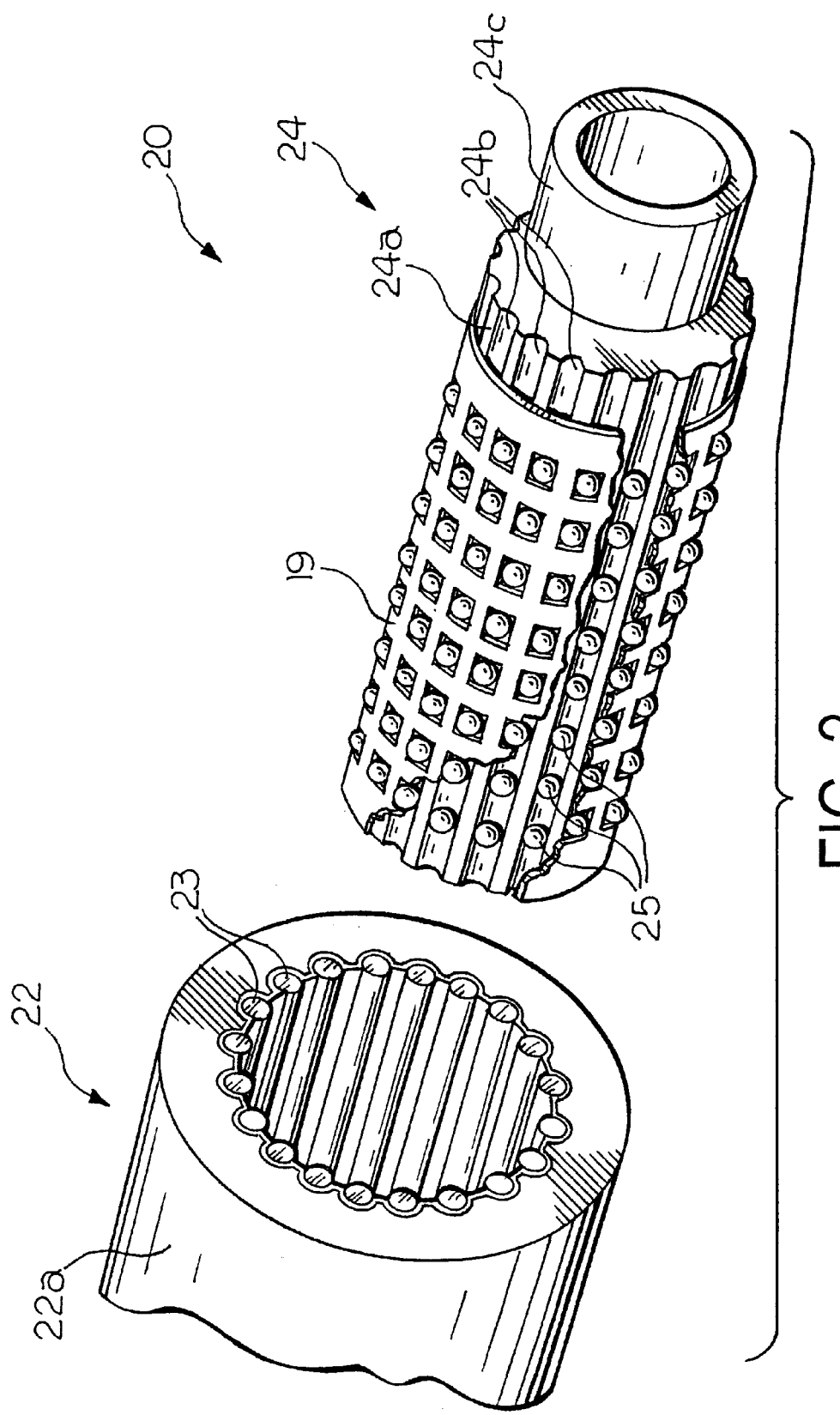
FIG. 2 is an enlarged, exploded perspective view, partially broken away, of the slip joint illustrated in FIG. 1.
Figure 4:
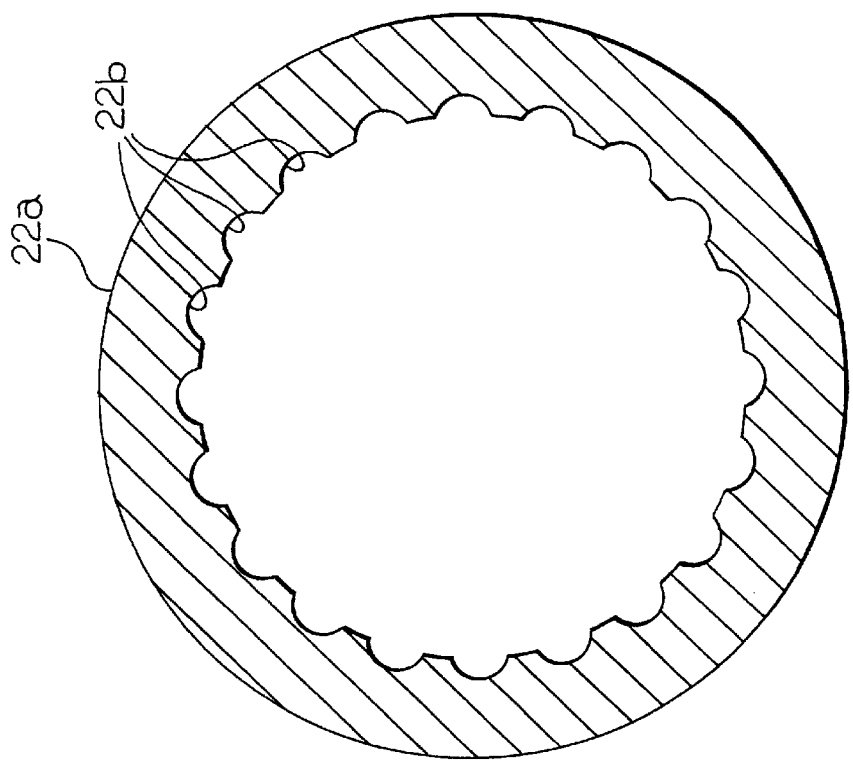
FIG. 4 is a sectional elevational view of the hollow cylindrical member illustrated in FIG. 3 after having a plurality of longitudinally extending grooves formed therein.
Figure 3:
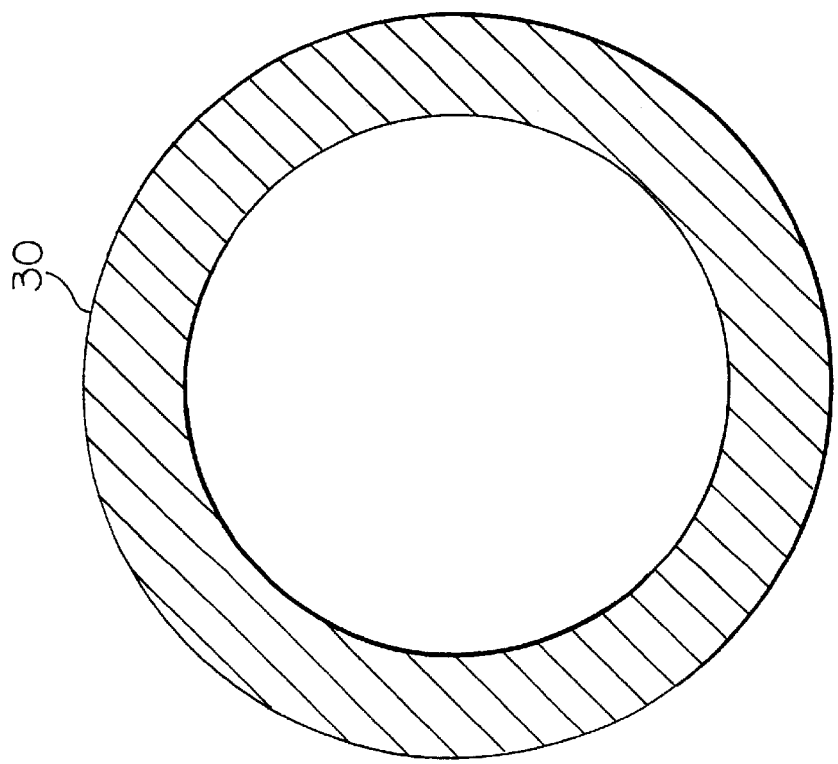
FIG. 3 is a sectional elevational view of a hollow cylindrical member that can be used to formed a female splined member for the slip joint illustrated in FIGS. 1 and 2.

Referring now to FIGS. 3 through 7, there is illustrated the steps in the method of this invention for forming the female splined member 22 illustrated in FIG. 2. Initially, a hollow cylindrical member 30, as shown in FIG. 3, is provided. The hollow cylindrical member 30 may be formed from any desired material, but is preferably formed from metallic material, such as steel or aluminum. Then, as shown in FIG. 4, the hollow cylindrical member 30 is re-shaped by any conventional process to form the female tubular member 22a having an inner surface provided with a plurality of circumferentially spaced, longitudinally extending grooves 22b, as shown in FIG. 4. The hollow cylindrical member 30 can be re-shaped in this manner by any conventional process. For example, the hollow cylindrical member 30 can be re-shaped by inserting a mandrel (not shown) into the hollow cylindrical member 30 and then collapsing the hollow cylindrical member 30 about the circumferential surface of the mandrel. The hollow cylindrical member 30 can, for example, be collapsed in this manner using a magnetic pulse formation process. The longitudinally extending grooves 22b are sized and spaced in accordance with a desired number and position of splines to be formed on the inner surface of the female tubular member 22a.

Figure 5:
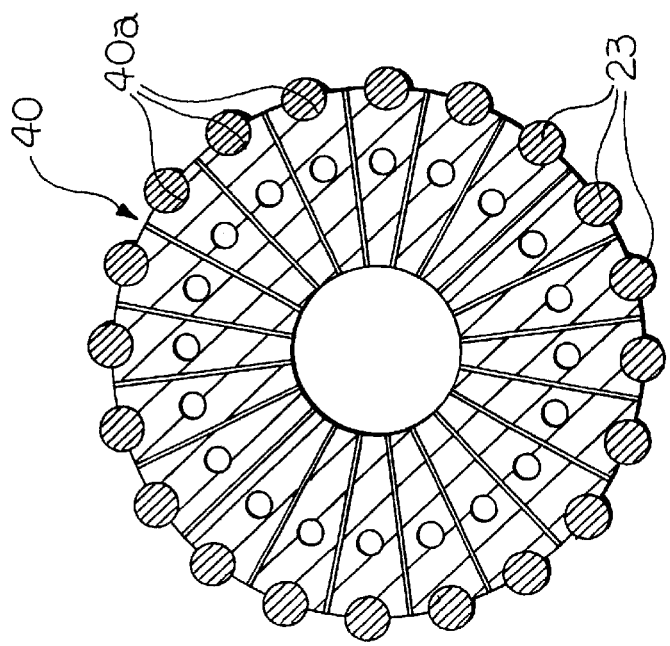
FIG. 5 is a sectional elevational view of a male positioning mandrel having a plurality of elongated rods supported thereon.

Next, as shown in FIG. 5, a male positioning mandrel, indicated generally at 40, is provided. The male positioning mandrel 40 includes an outer surface having a plurality of circumferentially spaced, longitudinally extending grooves 40a provided in the outer surface thereof. Similar to the grooves 22b discussed above, the grooves 40a are also sized and circumferentially spaced in accordance with a desired number and position of splines to be formed on the inner surface of the female tubular member 22a. Next, an elongated rod 23 is disposed in each of the longitudinally extending grooves 40a formed in the outer surface of the male positioning mandrel 40. The elongated rods 23 can be formed from any desired material, but preferably are formed from a strong, rigid material, such as steel, to provide a hardened wear surface. The elongated rods 23 can be temporarily retained in the longitudinally extending grooves 40a by any conventional means. For example, the elongated rods 23 can be temporarily retained in the grooves 40a by a mechanical retainer, such as a cage (not shown), adhesives, and the like. Alternatively, the elongated rods 23 can be temporarily retained in the grooves 40a sizing such grooves 40a to frictionally engage and retain the elongated rods 23 therein.

The male positioning mandrel 40 can further include a mechanism for injecting a quantity of a positioning material about the elongated rods 23. The injecting mechanism can, for example, include a manifold, indicated generally at 40b, that is provided in the interior of the male positioning mandrel 40. The illustrated manifold 40b is an enlarged central bore that is formed through the interior of the male positioning mandrel 40. The injecting mechanism can further include a plurality of passageways 40c that extend radially outwardly from the manifold 40b to the outer surface of the male positioning mandrel 40. In the illustrated embodiment, the passageways 40c are axially and circumferentially spaced apart from one another and extend radially outwardly between adjacent ones of the longitudinally extending grooves 40a provided in the outer surface of the male positioning mandrel 40. However, the passageways 40c may be oriented in any desired configuration. Lastly, the injecting mechanism can include one or more channels 40d formed in the male positioning mandrel 40 through which coolant can flow. The purposes for the manifold 40b, the passageways 40c, and the coolant channels 40d will be explained below.

Figure 6:
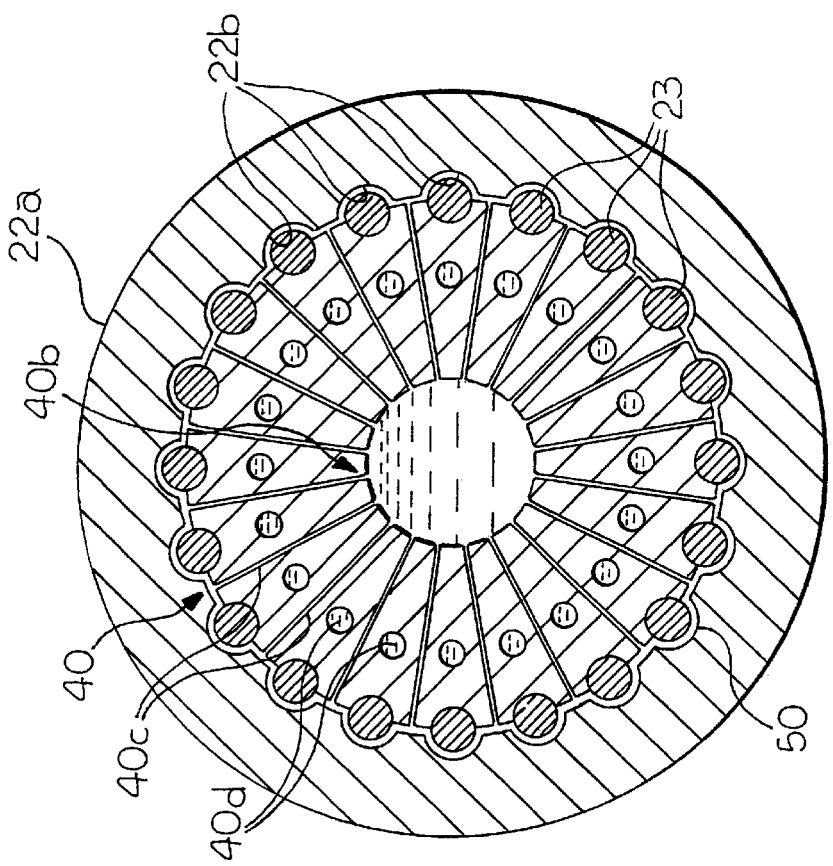
FIG. 6 is a sectional elevational view showing the male positioning mandrel and the elongated rods illustrated in FIG. 5 positioned concentrically within the hollow cylindrical member illustrated in FIG. 4.

As shown in FIG. 6, the male positioning mandrel 40 having the elongated rods 23 supported thereon can be inserted concentrically within the female tubular member 22a. When so positioned, the radially outermost portions of the elongated rods 23 extend within the adjacent longitudinally extending grooves 22b formed in the female tubular member 22a. The male positioning mandrel 40 supports the elongated rods 23 in this orientation while a quantity of positioning material 50 is introduced between the outer surface of the male positioning mandrel 40 and the inner surface of the female tubular member 22a. The positioning material 50 can, for example, be embodied as a hardenable liquid material that is introduced through the injecting mechanism described above. To accomplish this, the positioning material 50 is injected into the manifold 40b and radially outwardly through the passageways 40c. Alternatively, the positioning material 50 can be injected through the female tubular member 22a through ports (not shown) provided through the female tubular member 22a or in any other manner.

When injected, the positioning material 50 fills the spaces between the elongate rods 23 and the longitudinally extending grooves 22b in the female tubular member 22a. The positioning material 50 can also be injected into the annular spaces between the outer surface of the male positioning mandrel 40 and the inner surface of the female tubular member 22a, between adjacent ones of the elongated rods 23. The positioning material 50 can be embodied as any material that is suitable for retaining the elongated rods 23 in the longitudinally extending grooves 22b provided in the inner surface of the female tubular member 22. For example, the positioning material 50 can be a molten plastic material that is filled or impregnated with glass or other reinforcing material. The positioning material 50 can, if desired, be heated to facilitate flow thereof through the manifold 40b and the passageways 40c.

Once the positioning material 50 has been injected, it is caused to retain the elongated rods 23 in the longitudinally extending grooves 22b provided in the inner surface of the female tubular member 22. This can be accomplished by causing the positioning material 50 to change from a liquid state to a solid state. This change of state can be achieved by allowing the hot liquid positioning material 50 to cool and thereby solidify. Such cooling can be expedited by the passage of coolant through the coolant channels 40d formed in the male positioning mandrel 40. In the illustrated embodiment, the passageways 40c are sized to be relatively small in comparison with the manifold 40b. This is desirable because it facilitates the separation of the positioning material 50 injected about the elongated rods 23 from the positioning material that remains in the passageways 40c, thereby allowing easy removal of the male positioning mandrel 40 from the female tubular member 22b after the injection process is completed.

Figure 7:
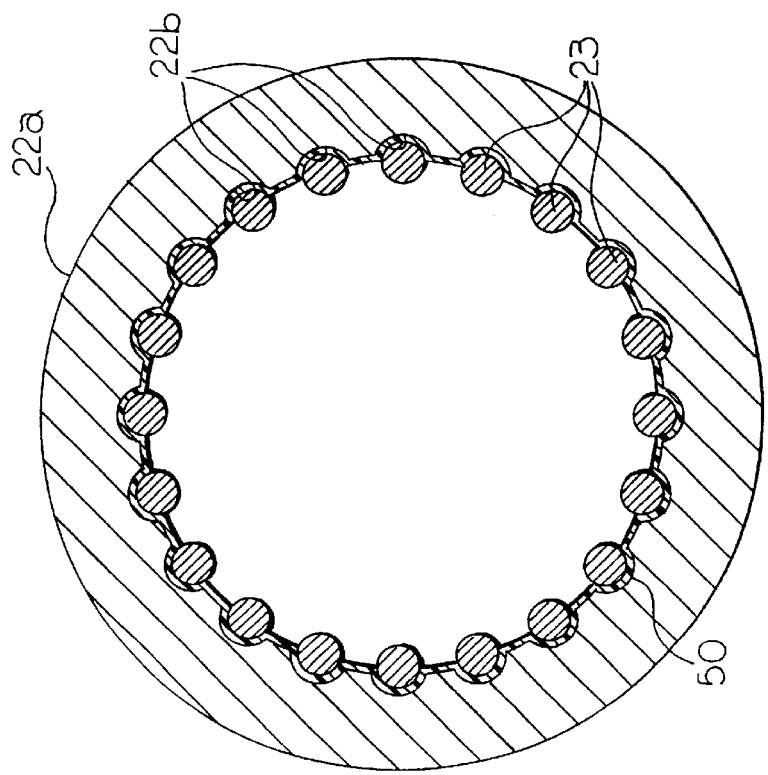
FIG. 7 is a sectional elevational view showing the female splined member that has been formed after a quantity of positioning material has been introduced by the male positioning member between the elongated rods and the longitudinally extending grooves of the hollow cylindrical member.

Upon hardening, the positioning material 50 retains the elongates rods 23 in the longitudinally extending grooves 22b provided in the inner surface of the female tubular member 22a. After the positioning material 50 has hardened, the male positioning mandrel 40 is removed, as shown in FIG. 7. The elongate rods 23 remain in the longitudinally extending grooves 22b in the female tubular member 22a, thereby forming a plurality of internal splines. Thus, the longitudinally extending grooves 22b need not be precisely formed to conform closely to the elongated rods 23, but rather need only be generally formed to allow the positioning material 50 to envelop the elongated rods 23 and support them on the female tubular member 22a. Thus, the positioning material 50 functions to both position the elongated rods 23 and retain them in desired positions on the female tubular member 22a. The positioning material 50 can also function to physically insulate the elongated rods 23 from the female tubular member 22a. Consequently, the female tubular member 22 and the elongate rods 23 can be formed from dissimilar materials without being susceptible to undesirable galvanic corrosion. For example, the female tubular member 22 can be formed from a relatively lightweight material, such as aluminum, while the elongated rods 23 can be formed from a relatively heavier material, such as steel. The positioning material 50 provides a barrier between the aluminum and steel to prevent the occurrence of galvanic corrosion.

Figure 8:
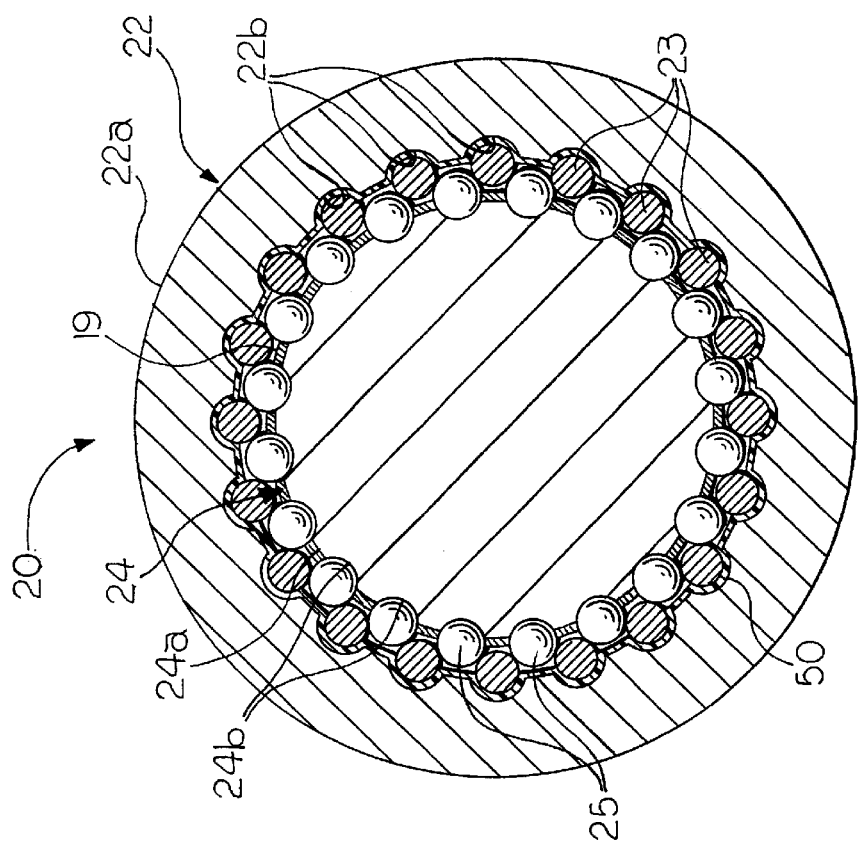
FIG. 8 is a sectional elevational view of the assembled slip joint illustrated in FIGS. 1 and 2.

After the female splined member 22 has been manufactured in accordance with the method of this invention, the slip joint 20 is assembled as shown in FIG. 8. In this assembled condition, the balls 25 are supported in the elongated grooves 24b in the cylindrical body portion 24a of the male member 24 of the slip joint 20. The cage 19 is provided about the cylindrical body portion 24a. The cage 19 functions to retain the balls 25 in a fixed relation to one another and limit the travel of the balls 25 in the elongated grooves 24b in the male member 24. The male member 24 and the balls 25 and cage 19 supported by the male member 24 are inserted into the female splined member 22 so that the balls 25 in each of the elongated grooves 24b in the male member 24 are disposed between two adjacent elongate rods 23. The balls 25 engage or cooperate with the elongate rods 23 in a circumferential direction (in a clockwise or counterclockwise direction when viewing FIG. 8) to transmit torque or rotational force between the female splined member 22 and the male member 24. Moreover, the female splined member 22 and the male member 24 are telescopically displaceable relative to one another. The balls 25 facilitate unencumbered telescopic displacement between the female splined member 22 and the male member 24. As stated above, the telescoping nature of the slip joint assembly 20 facilitates the installation of the driveshaft assembly 15 within a vehicle, accommodates relative axial movement between the transmission 12 and the axle assembly 14, and provides for some collapsibility of the driveshaft in the event of a collision of the vehicle.

Although this invention has been described in the context of the illustrated female splined member 22, it will be appreciated that the same general method can be used to form the male splined member 24, wherein the elongated rods 23 are supported in grooves formed in the outer surface of the body portion 24*a* of the male splined member by the positioning material 50.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A slip joint comprising:
   a first member including a surface having a first plurality of grooves formed therein, a rod disposed in each of said first plurality of grooves, and a quantity of material extending between said first member and each of said rods for retaining said rods within said first plurality of grooves to define a plurality of splines on said first member that extend beyond said surface;
   a second member including a surface having a second plurality of grooves formed therein; and
   a plurality of balls disposed in each of said second plurality of grooves, said plurality of balls cooperating with said rods on said first member to provide a rotatable driving connection between said first and second members, while permitting relative axial movement therebetween.

2. The slip joint defined in claim 1 wherein each of said first plurality of grooves extends longitudinally along said first member.

3. The slip joint defined in claim 2 said rods are elongated and are disposed in said first plurality of longitudinally extending grooves.

4. The slip joint defined in claim 1 wherein said material is disposed between said rods and said first member.

5. The slip joint defined in claim 1 wherein said material is disposed between adjacent ones of said rods.

6. The slip joint defined in claim 1 wherein said material is disposed between said rods and said first member and also between adjacent ones of said rods.

7. The slip joint defined in claim 1 wherein said material is formed from a plastic material.

8. The slip joint defined in claim 7 wherein said plastic material is impregnated with glass or other reinforcing material.

9. The slip joint defined in claim 1 wherein said first member and said rods are formed from different materials.

10. The slip joint defined in claim 1 wherein said first member is generally hollow and cylindrical in shape and includes an inner surface, and wherein said first plurality of grooves is formed in said inner surface.

11. The slip joint defined in claim 10 wherein said second member is generally cylindrical in shape and includes an outer surface, and wherein said second plurality of grooves is formed in said outer surface.

12. The slip joint defined in claim 1 wherein said first member is generally cylindrical in shape and includes an outer surface, and wherein said first plurality of grooves is formed in said outer surface.

13. The slip joint defined in claim 12 wherein said second member is generally hollow and cylindrical in shape and includes an inner surface, and wherein said second plurality of grooves is formed in said inner surface.

14. The slip joint defined in claim 1 further including a cage for retaining said balls in said first and second pluralities of grooves.

* * * * *